(12) United States Patent
Sitton et al.

(10) Patent No.: US 7,925,164 B2
(45) Date of Patent: Apr. 12, 2011

(54) METHOD AND SYSTEM FOR POWER MANAGEMENT CONTROL IN PASSIVE OPTICAL NETWORKS

(75) Inventors: Gal Sitton, Netanya (IL); Jacob Harel, Hod-Hasharon (IL); Ifat Naaman, Raanana (IL)

(73) Assignee: Broadlight Ltd., Herzliya (IL)

( * ) Notice: Subject to any disclaimer, the term of this patent is extended or adjusted under 35 U.S.C. 154(b) by 752 days.

(21) Appl. No.: 11/826,572

(22) Filed: Jul. 17, 2007

(65) Prior Publication Data

US 2008/0056720 A1 Mar. 6, 2008

Related U.S. Application Data

(60) Provisional application No. 60/840,955, filed on Aug. 30, 2006.

(51) Int. Cl.
*H04J 14/00* (2006.01)
*H04B 10/08* (2006.01)
*H04B 10/06* (2006.01)
*H04B 1/06* (2006.01)
*H04B 10/00* (2006.01)
*H04K 3/00* (2006.01)

(52) U.S. Cl. .......... 398/72; 398/66; 398/67; 398/68; 398/70; 398/71; 398/38; 398/39

(58) Field of Classification Search .......... 398/72, 398/38, 39
See application file for complete search history.

(56) References Cited

U.S. PATENT DOCUMENTS

| | | | | |
|---|---|---|---|---|
| 6,115,163 | A * | 9/2000 | Nobuhara | 398/210 |
| 6,498,667 | B1 | 12/2002 | Masucci et al. | |
| 6,801,497 | B1 | 10/2004 | Van Driessche | |
| 7,072,582 | B2 * | 7/2006 | Stevens | 398/38 |
| 7,391,971 | B2 * | 6/2008 | McCloskey et al. | 398/38 |
| 7,548,694 | B2 * | 6/2009 | Kazawa et al. | 398/67 |
| 7,583,898 | B1 * | 9/2009 | Dalton et al. | 398/100 |
| 7,606,490 | B2 * | 10/2009 | Dalton et al. | 398/71 |
| 7,680,414 | B2 * | 3/2010 | Kazawa et al. | 398/67 |
| 2003/0076569 | A1 * | 4/2003 | Stevens | 359/187 |
| 2003/0113118 | A1 * | 6/2003 | Bartur | 398/139 |
| 2003/0128988 | A1 * | 7/2003 | Hamilton | 398/120 |
| 2004/0247316 | A1 | 12/2004 | Soto et al. | |
| 2004/0264957 | A1 * | 12/2004 | Ng et al. | 398/38 |
| 2005/0019036 | A1 * | 1/2005 | Soto et al. | 398/135 |
| 2005/0025417 | A1 * | 2/2005 | Hallemeier et al. | 385/28 |

(Continued)

FOREIGN PATENT DOCUMENTS

JP 2007027819 A * 2/2007

OTHER PUBLICATIONS

ITU-T Rec. G. 984.3 (Feb. 2004) pp. 1-107.*

(Continued)

*Primary Examiner* — Ken N Vanderpuye
*Assistant Examiner* — Oommen Jacob
(74) *Attorney, Agent, or Firm* — Myers Wolin LLC

(57) ABSTRACT

An optical line terminal (OLT) performs power management control in a passive optical network (PON) by acquiring a respective reception level for each optical network unit (ONU) in the PON and maintaining a reception table that stores the respective reception level for each ONU. Prior to receiving a burst signal from an ONU, it sets a reception threshold of an optical receiver at the OLT with the reception level of the ONU.

18 Claims, 4 Drawing Sheets

U.S. PATENT DOCUMENTS

| | | | |
|---|---|---|---|
| 2005/0158048 A1* | 7/2005 | Sung et al. | 398/66 |
| 2005/0163505 A1* | 7/2005 | Kinoshita et al. | 398/38 |
| 2006/0009931 A1* | 1/2006 | Smith et al. | 702/58 |
| 2006/0215545 A1* | 9/2006 | Nelson | 370/216 |
| 2006/0268759 A1* | 11/2006 | Emery et al. | 370/321 |
| 2006/0280502 A1* | 12/2006 | Sekine et al. | 398/71 |
| 2007/0074086 A1* | 3/2007 | Goth | 714/709 |
| 2007/0081827 A1* | 4/2007 | Ide et al. | 398/209 |
| 2007/0122163 A1* | 5/2007 | Dalton et al. | 398/208 |
| 2007/0127923 A1* | 6/2007 | Dalton et al. | 398/71 |
| 2007/0143645 A1* | 6/2007 | Haran | 714/704 |
| 2007/0154225 A1* | 7/2007 | Schulz et al. | 398/202 |
| 2007/0223920 A1* | 9/2007 | Moore et al. | 398/38 |
| 2007/0237189 A1* | 10/2007 | Miguel et al. | 370/907 |
| 2007/0237523 A1* | 10/2007 | Miguel et al. | 398/71 |
| 2007/0248357 A1* | 10/2007 | Fediakine et al. | 398/27 |
| 2007/0264016 A1* | 11/2007 | DeLew | 398/71 |
| 2007/0264031 A1* | 11/2007 | Dalton | 398/208 |
| 2007/0274717 A1* | 11/2007 | Xu et al. | 398/58 |
| 2007/0274720 A1* | 11/2007 | Menasco et al. | 398/66 |
| 2007/0286611 A1* | 12/2007 | Weber et al. | 398/202 |
| 2007/0292132 A1* | 12/2007 | Zhao et al. | 398/63 |
| 2008/0056714 A1* | 3/2008 | Konstan | 398/38 |
| 2008/0181603 A1* | 7/2008 | Liu et al. | 398/25 |

OTHER PUBLICATIONS

ITU-T Rec. G.984.3 (Feb. 2004).*
ITUT Rec. G.984.3 (Feb. 2004).*
"Gigabit-capable Passive Optical Networks (G-PON): Transmission convergence layer specification", ITU-T Recommendation G.984.3, *International Telecommunication Union*, pp. 1-107, (Feb. 2004).

* cited by examiner ously shown in FIG. 1. The PON 100 includes M ONUs 120-1

METHOD AND SYSTEM FOR POWER MANAGEMENT CONTROL IN PASSIVE OPTICAL NETWORKS

CROSS-REFERENCE TO RELATED APPLICATION

This application claims priority from U.S. provisional patent No. 60/840,955 filed on Aug. 30, 2006, whose contents are wholly incorporated herein by reference.

REFERENCES CITED

Patents

| U.S. Pat. No. 6,801,497 | October 2004 | Van Driessche |
| U.S. Pat. No. 6,498,667 | December 2002 | Masucci, et al. |
| U.S. Pat. No. 20040247316 | December 2004 | Soto; et al. |

Other References

GPON Standard Chapter IV

TECHNICAL FIELD

The present invention relates generally to passive optical networks (PONs), and more particularly to power management control in such networks.

BACKGROUND OF THE INVENTION

A passive optical network (PON) comprises an optical line terminal (OLT) connected to multiple optical network units (ONUs) in a point-to-multi-point network. New standards have been developed to define different types of PONs, each of which serves a different purpose. For example, the various PON types known in the related art include a Broadband PON (BPON), an Ethernet PON (EPON), a Gigabit PON (GPON), and others.

An exemplary diagram of a typical PON 100 is schematically shown in FIG. 1. The PON 100 includes M ONUs 120-1 through 120-M coupled to an OLT 130 via a passive optical splitter 140. Traffic data transmission may be achieved using GEM fragments or ATM cells over two optical wavelengths, one for the downstream direction and another for the upstream direction. Thus, downstream transmission from the OLT 130 is broadcast to all the ONUs 120. Each ONU 120 filters its respective data according to, for example, pre-assigned labels.

The OLT 130 includes a transmitter (not shown) for transmitting downstream data to the ONUs 120 and a receiver (not shown) for receiving upstream burst data sent to OLT 130 from ONUs 120. The OLT 130 broadcasts data to the ONUs 120 along a common channel so that all the ONUs 120 receive the same data. Since all ONUs function in like manner, they will be collectively referred to by the reference numeral 120 in the following description unless reference is made to a specific ONU. Each of ONUs 120 includes a transmitter (not shown) for transmitting respective data to the OLT 130 during different time slots allocated by the OLT 130. To this end, the OLT 130 must allocate bandwidth to the ONUs 120 and specify when, during a complete cycle in which upstream data is sent from the ONUs 120 to the OLT 130, each ONU may transmit. That is, the OLT 130 is aware of the exact arrival time of data and the identity of a transmitting ONU 120.

The optical receiver at the OLT 130 must have the ability to cope with variation in the received optical power from burst to burst, since the path loss between each ONU 120 and the OLT 130 is different. Therefore, the OLT's 130 receiver requires a large dynamic range and should be able to set the threshold that discriminates low logic levels ("0" bits) from high logic levels ("1" bits) as quickly as possible. Alternatively, a transmitter of each ONU 120 may implement a power-leveling process, so as to allow adjustment of the output power at an ONU 120 according to the dynamic range of the OLT 130.

The power-leveling process is performed during initial set-up and normal operation modes of the PON. Generally, in the set-up mode an ONU 120 and the OLT 130 may be in one of the following operation states: serial number or ranging. In the former state, the OLT 130 tries to detect the serial number of an ONU 120. If the OLT 130 and the ONU 120 have not completed the serial number state protocol, due to a low power signal, the ONU 120 independently changes its optical power output until a successful detection of the serial number. In the ranging state, an ONU 120 transmits a ranging field in response to a ranging request. The OLT 130 measures the average optical power received from the ONU 120 and compares it to an OLT reception (RX) threshold. If the received power is above or below the RX threshold, the OLT 130 requests the specific ONU 120 to increase or decrease its output optical power.

During a normal operation mode, the OLT 130 periodically measures the average received optical power of a specific ONU 120 and compares it to a RX threshold. If the received power is above or below the RX threshold, the OLT 130 sends a message to the specific ONU 120 to decrease or increase respectively its optical power output. Typically, each transmitter in the ONUs 120 is configured with a fixed number of power states, each of which defines a different attenuation value. Upon receiving the message for changing the output power, the ONU transmitter changes its power state. The power-leveling process is described in detail in the respective PON standards, e.g., the ITU-T G.984.2 G.984.3 standards.

The power-leveling allows implementing optical receivers, at the OLTs, with narrower dynamic range, and thus reducing the cost of such receiver. However, on the other hand, such a solution requires complicated hardware in each ONU and a sophisticated power management protocol.

It would be therefore advantageous to provide a solution for power management control in PON systems that enables reliable burst-mode operation between the ONU and the OLT operating in distributed network environment.

SUMMARY OF THE INVENTION

The present invention provides a system and method for power management control performed and implemented by optical line terminals (OLTs). Specifically, the disclosed system in the OLT acquires the received optical power of each optical network unit (ONU) in a passive optical network (PON). The OLT sets the reception threshold of its optical receiver with the acquired reception level for an ONU prior to receiving data from that ONU. The invention allows developing ONUs transceivers with relatively simple and cheaper optical components to reduce the cost to manufacture, and OLTs with a narrow dynamic range or with improved system performance. Furthermore, the invention simplifies the power management control protocols suggested by the respective PON standards, thus reducing system complexity and possible interoperability problems.

In accordance with a first aspect of the invention there is provided a method for power management control in a passive optical network (PON), the method comprising:

acquiring by an optical line terminal (OLT) a respective reception level for each optical network unit (ONU) in the PON;

maintaining in the OLT a reception table that stores the respective reception level for each ONU; and prior to receiving a burst signal from an ONU, setting a reception threshold of an optical receiver at the OLT with the reception level of the ONU.

In accordance with a second aspect of the invention there is provided an optical line terminal (OLT) controller for power management control in a passive optical network (PON), said OLT comprising:

a power management controller for setting a reception threshold of an optical receiver with a reception level of an optical network unit (ONU), prior to receiving a burst signal from the ONU; and a memory for storing a reception table that maintains the respective reception level for each of the ONUs.

The method described herein can be implemented in hardware, software, firmware or any combination thereof.

BRIEF DESCRIPTION OF THE DRAWINGS

In order to understand the invention and to see how it may be carried out in practice, some embodiments will now be described, by way of non-limiting example only, with reference to the accompanying drawings, in which.

DETAILED DESCRIPTION OF SOME EMBODIMENTS OF THE INVENTION

Figure 1:
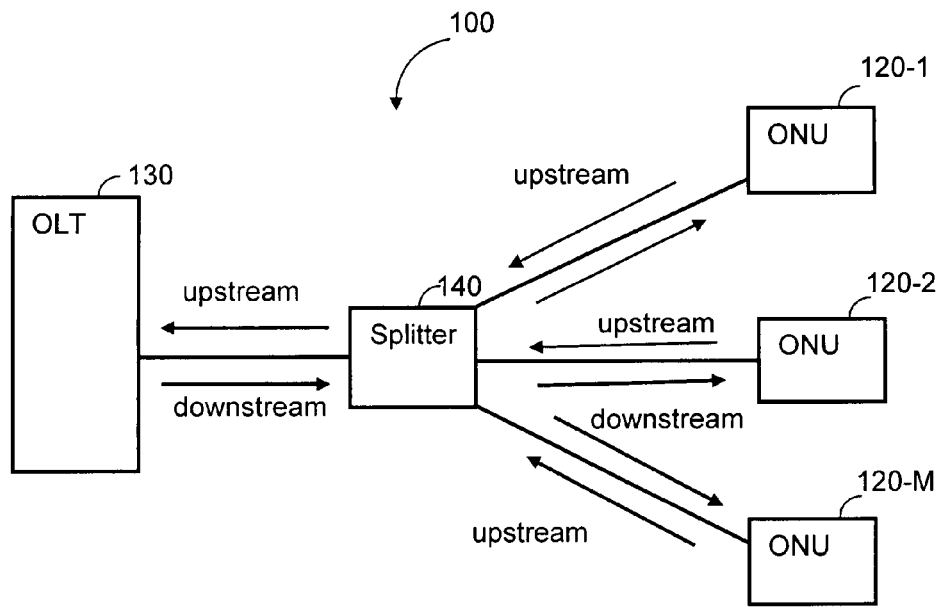
FIG. 1 is a schematic diagram of a prior art PON.
Figure 2:
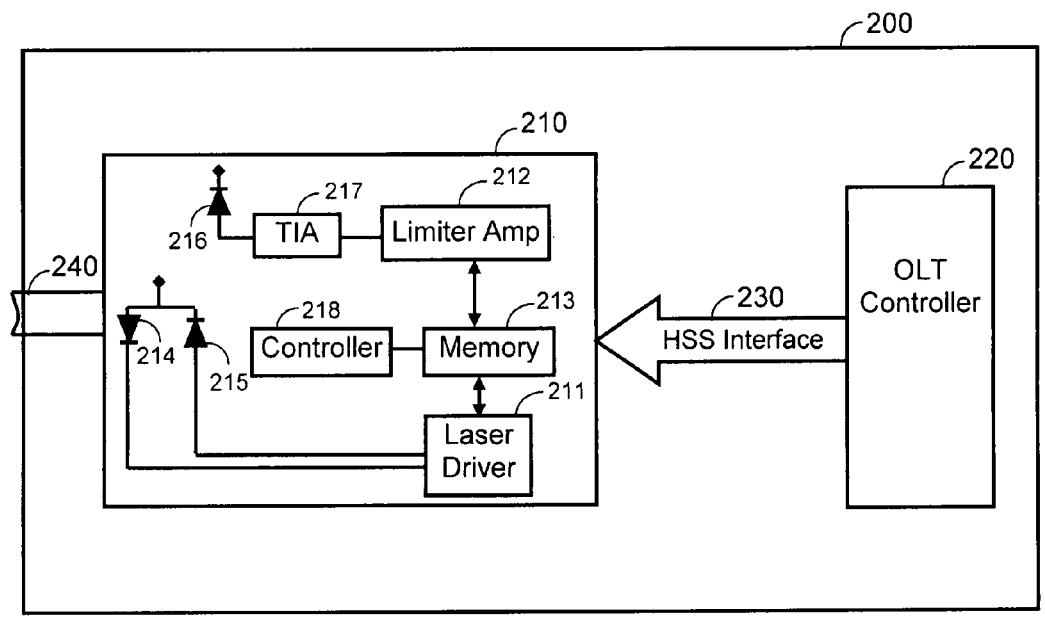
FIG. 2 is a schematic block diagram of an OLT constructed an operative in accordance with an embodiment of the present invention.

FIG. 2 shows a schematic block diagram of an OLT 200 that includes a physical (PHY) layer interface 210 and an OLT controller 220 communicating using high speed serial (HSS) interface 230. Other circuitry and components of a typical OLT system are not shown, merely for keeping the description simple and without limiting the scope of the disclosed invention. It should be noted that the HSS interface 230 can be replaced with other types of interface that would allow to the PHY layer interface 210 and OLT controller 220 to communicate with each other.

The PHY layer interface 210 includes an optical transceiver that acts to transmit and receive optical signals to and from the ONUs via an optical fiber 240. Specifically, the PHY layer interface 210 comprises of a laser driver 211, a limiter amplifier 212, a memory 213, a laser diode 214 coupled to a photodiode 215, a photodiode 216 coupled to a transimpedance amplifier (TIA) 217, and a PHY controller 218.

The laser driver 211, laser diode 214 and photodiode 215 are part of the optical transmitter and are operative to transmit continuous data to the ONUs. The laser diode 214 produces optical signals based on the output signals provided by the laser diode driver 211. The photodiode 215 produces current in proportion to the amount of light emitted by laser diode 214. The laser driver 211 is capable of driving various laser diodes types and implements (together with photodiode 215) a closed-loop control to guarantee optimal optical performance over lifetime and temperature change.

The limiter amplifier 212, photodiode 216 and TIA 217 form the optical receiver. The photodiode 216 generates a current in proportion to the amount of light of the optical input signal in the optical fiber 240. The current produced by the photodiode 216 is amplified by the TIA 217. The PHY controller 217 controls the TIA gain by an analog voltage signal. The PHY controller 217 can save the amplified value relative to the analog voltage signal in the memory 213. The TIA 217 and the limiter amplifier 212 handle upstream burst data at high speed rates and can be controlled using control signals internally asserted by the PHY adapter 210. In accordance with one embodiment of the present invention, the limiter amplifier 212 is set to a reception level at which data sent from each ONUs is received at the OLT. As each ONU transmits data at different power and also owing to path losses, the data at the OLT is received at different power levels. Therefore, setting the reception levels accommodates for those differences, and thus allows fast acquisition of signals.

Each ONU has its reception level. Specifically, the memory 213 includes a table (hereinafter the "reception table") that specifies for each ONU, designated by its ONU-ID, its reception level. Alternatively, the memory 213 may be either integrated in the OLT controller 220 (the reception level is passed to the PHY layer interface 210 over the HSS interface 230) or externally coupled to the PHY layer interface 210. In a sense the reception level determines the extent to which the limiter amplifier 213 is required to set its RX threshold. The memory 213 is a programmable memory. The ONU-ID is provided by the OLT controller 220 and the reception level is retrieved, by means of the PHY controller 218, from the reception table using the ONU-ID. The OLT, in general, knows the exact time that an ONU transmits data as it allocates the time slots for transmissions. Therefore, the OLT controller 220 sends the ONU-ID of a specific ONU to the PHY controller 218 prior to the arrival of data transmitted by that ONU.

The PHY layer interface 210 acquires the received power of each ONU during an initial set-up mode (i.e., the serial-number and ranging states) and normal operation mode. To this end, the PHY layer interface 210 implements fast and accurate acquisition techniques for signal tracking. The OLT controller 220 acts to process signals received from ONUs and manage the power management process disclosed by the present invention. Specifically, the OLT controller 220 informs the PHY layer interface 210 of the current operation mode and when to start the reception power adjustment; controls the acquisition mode; and sends the ONU-ID of a current transmitting ONU. The operation of the PHY layer interface 210 and OTL controller 220 at the various operation modes is described in detail below. The HSS interface 230 is a unidirectional serial data line that implements a proprietary protocol (described below) from the OLT controller 220 to the PHY layer interface 210.

Figure 3:
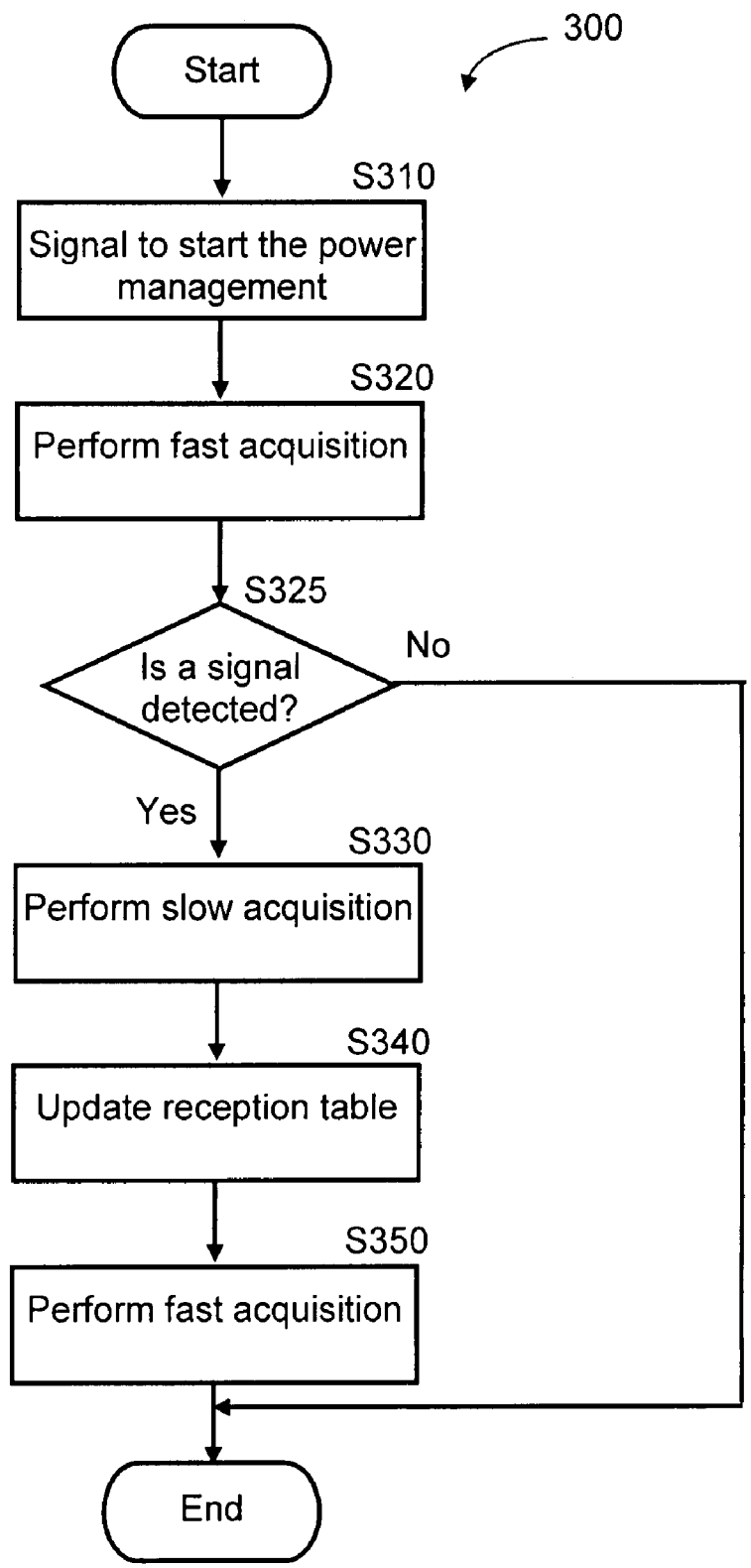
FIG. 3 is a flowchart describing the power management control during the set-up operation mode in accordance with an embodiment of the present invention

FIG. 3 shows an exemplary and non-limiting flowchart 300 describing the power management control during the set-up operation mode as implemented by an OLT in accordance with an embodiment of the present invention. The process is carried out by the PHY layer interface 210 and OLT controller 220 described above.

The set-up operation mode takes place during the activation procedures of an ONU. Two states are possible during this mode: serial number and ranging. In the serial number state, the OLT tries to detect the serial number that is the ONU's identifier (ID), while in the ranging state the OLT tries to determine the range between the terminal units (i.e., ONUs and OLT). Regardless of the active state, in the set-up mode the exact arrival time of data bursts sent from a designated ONU is unknown. However, this time is expected to occur at a predefined window ("ranging window").

At S310, the OLT controller 220 signals the PHY layer interface 210 to start the power management process for a specific ONU. This is performed before the beginning of a ranging window of the ONU. In one embodiment, the signaling is performed by sending a control word over the HSS interface 230, having the following format:

{<Start-Bit>, <Mode-Bit>, <ONU-ID>}

The mode-bit indicates the current operation mode, i.e., set-up. The ONU-ID field includes either a default value when operating in a serial-number state or the ID of an ONU that is assumed to transmit data in the ranging state. At S320, upon reception of the control word, the PHY layer interface 220 is set to operate in a fast acquisition mode to track incoming signals as quickly as possible. The acquision begins at the lowest possible energy level, i.e., such level that allows fast detection of signal while avoiding false detections. At S325 it is checked if a burst is detected during the ranging window, and if so, execution continues with S330; otherwise execution ends. At S330, a detection signal is asserted instructing the PHY layer interface 210 to switch into a slow acquisition mode for the duration of the burst reception. At S340, the reception table is updated. In the ranging state the PHY layer interface 210 saves the measured received power in the reception field of the respective ONU. In the serial number state, the execution continues with S350. At S350, at the end of the data burst the PHY layer interface 210 returns to fast acquisition mode, for example, by asserting a limiter amplifier (LA) reset signal. Thereafter, the PHY interface 210 and OLT controller 220 can receive data from other ONUs either in a normal or set-up modes of operation.

Figure 4:
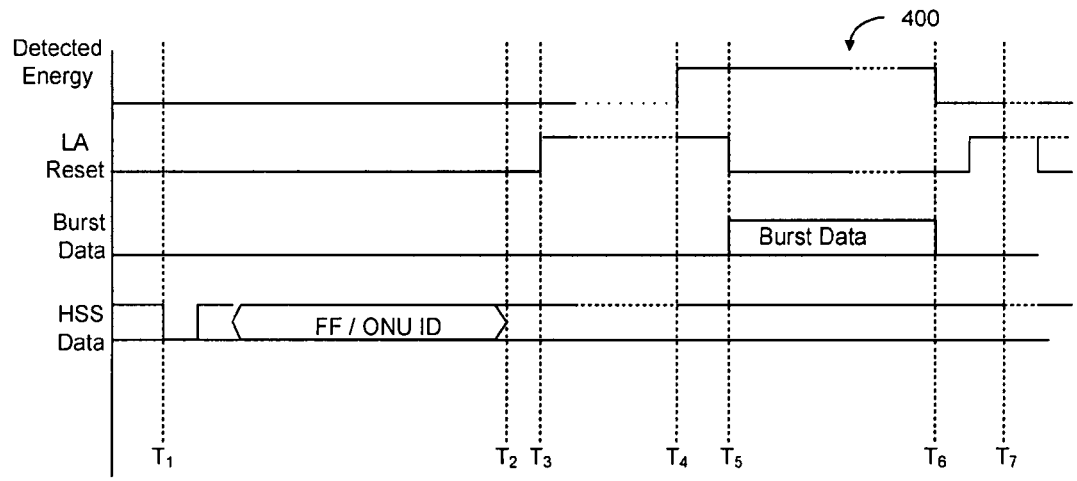
FIG. 4 is a timing diagram illustrating the process described in FIG. 3

FIG. 4 provides a timing diagram 400 illustrating the process described with reference to FIG. 3. As shown, during times $T_1$ and $T_2$ the control word is sent to the PHY interface 210 over the HSS interface 230. The transmission of the control word ends prior to the beginning of the ranging window at $T_3$. At time $T_4$, an input signal is detected and at time $T_5$ a transmitted burst data is received at the OLT, and as a result, the PHY interface 210 starts the slow acquisition. When the reception of the burst data ends at time $T_6$, the PHY interface 210 resumes to fast acquisition. The power parameters are saved in the reception table between times $T_5$ and $T_6$. At time $T_7$, the ranging window ends.

In accordance with another embodiment of the present invention, a power-leveling calibration process is described. In this embodiment, the OLT determines the optimum power at which data should be received. That is, such power level that allows the OLT to decisively discriminate between "0" and "1" bits, and thus to reduce the number of errors. For this purpose, during the ranging process the PHY layer interface 210 amplifies or attenuates the received signal until an optimum power is detected. This power is saved in the reception table in the respective ONU entry.

Figure 5:
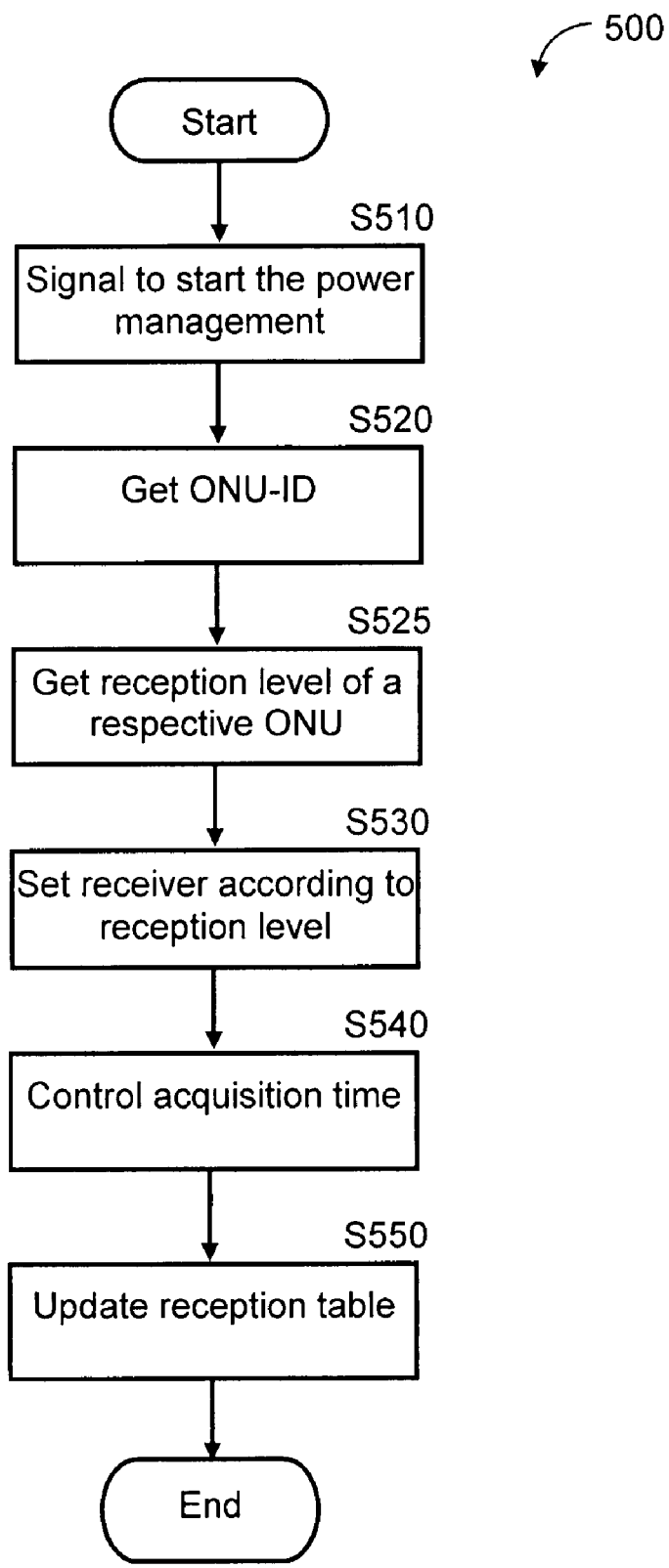
FIG. 5 is a flowchart describing the power management control during the normal operation mode in accordance with an embodiment of the present invention

FIG. 5 shows a non-limiting flowchart 500 describing the power management control during the normal operation mode as implemented by an OLT in accordance with an embodiment of the present invention. The process is carried out by the PHY layer interface 210 and OLT controller 220 described above. In the normal mode, an OLT receives data from a plurality of ONUs, where ONU transmit the data at a time slot assigned by the OLT.

At S510, the OLT controller 220 signals the PHY layer interface 210 to start the power management process for a specific ONU. This is performed immediately before data is received from that ONU. In one embodiment, the signaling is performed by sending a control word, over the HSS interface 230, having the following format:

{<Start-Bit>, <Mode-Bit>, <ONU-ID>}

The state bit indicates the current operation state, i.e. normal state. The ONU-ID field includes the ID of the ONU that is assumed to transmit data. At S520, upon reception of the control word, the PHY layer interface 210 extracts the ONU-ID from the control data and, at S525, retrieves the reception level from the reception table. At S530, the optical receiver in the PHY interface 210 is set to receive signal having an average power as the retrieved reception level. At S540, the OLT controller 220 instructs the PHY interface 210 (for example, by asserting a LA reset signal) to operate in a fast acquisition mode until burst data is detected and to switch to slow acquisition mode during the burst duration. At S550, the reception table of the transmitting ONU is updated with the value of the received power. It should be noted that such update is performed only if a signal were detected.

Figure 6:
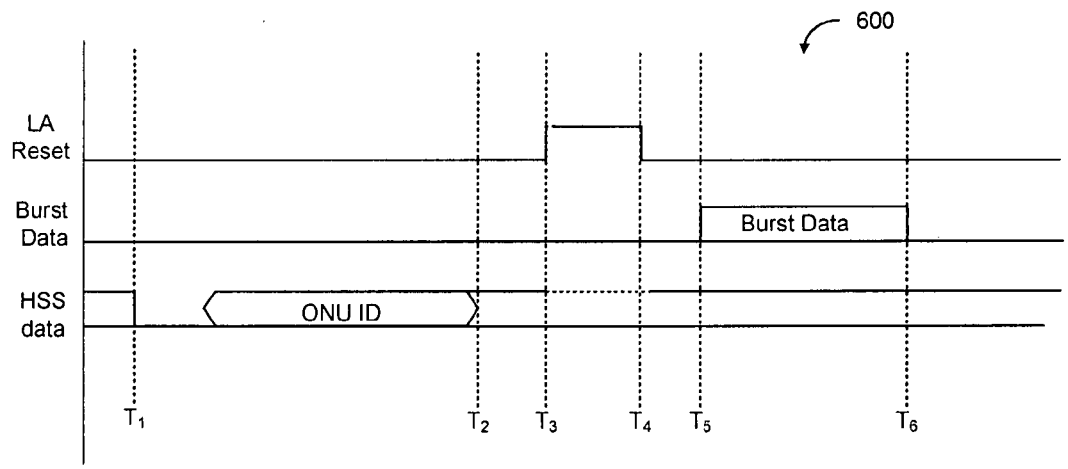
FIG. 6 is a timing diagram illustrating the process described in FIG. 5.

FIG. 6 provides a timing diagram 600 illustrating the process described with reference to FIG. 5. As shown, during times $T_1$ and $T_2$, a control word is sent to the PHY interface 210 over the HSS interface 230. The transmission of the control word ends prior to the arrival of burst data at time $T_5$. During times $T_3$ and $T_4$ the optical receiver is set with the appropriate reception level. At time $T_6$ the reception of the burst data ends.

In accordance with another embodiment the PHY controller 218 measures the power of the received signal and immediately adjusts the gain of the TIA 217 and the limiter amplifier 212.

It will also be understood that the OLT may implement a computer program readable by a computer for executing the method of the invention. Such a computer program may be realized by a machine-readable storage device tangibly embodying a program of instructions executable by the machine for executing the method of the invention.

The invention claimed is:

1. A method for power management control in a passive optical network (PON), the method comprising:
    during a ranging window in a set-up mode operation of the PON, acquiring by an optical line terminal (OLT) a respective reception level for each optical network unit (ONU) in the PON;
    maintaining in the OLT a reception table that stores the respective reception level for each ONU; and
    at a normal mode operation of the PON and prior to receiving a burst signal from an ONU, setting a reception threshold of an optical receiver at the OLT with the reception level of the ONU, wherein the reception threshold is set to the reception level retrieved from the reception table using an identification (ID) number of the ONU.

2. The method of claim 1, wherein acquiring the reception level during the ranging window further comprises:
    receiving at least the ID number of the ONU;
    setting an acquisition mode of the OLT to a fast acquisition;

setting the reception threshold to a lowest possible energy level;

measuring the power of a received burst signal, if a burst signal is received during the ranging window;

saving the power of the received signal together with the respective ID number of the ONU in the reception table; and setting an acquisition mode of the OLT to a slow acquisition.

3. The method of claim 2, wherein the lowest possible energy level allows fast detection of the burst signal.

4. The method of claim 3, wherein the measured power of the received signal is the reception level of the ONU.

5. The method of claim 1, further comprising:

measuring the power of the received burst signal; and updating the reception table with the measured optical power of the received burst signal.

6. A program storage device readable by machine, tangibly embodying a program of instructions executable by the machine to perform a method for power management control in a passive optical network (PON), the method comprising:

during a ranging window in a set-up mode operation of the PON, acquiring by an optical line terminal (OLT) a respective reception level for each optical network unit (ONU) in the PON;

maintaining in the OLT a reception table that stores the respective reception level for each ONU; and at a normal mode operation of the PON and prior to receiving a burst signal from an ONU, setting a reception threshold of an optical receiver at the OLT with the reception level of the ONU, wherein the reception threshold is set to the reception level retrieved from the reception table using an identification (ID) number of the ONU.

7. The program storage device of claim 6, wherein acquiring the reception level during the ranging window further comprises:

receiving at least the ID number of the ONU;

setting an acquisition mode of the OLT to a fast acquisition;

setting the reception threshold to a lowest possible energy level;

measuring the power of a received burst signal, if such signal is received during the ranging window;

saving the power of the received signal together with the respective ID number of the ONU in the reception table; and setting an acquisition mode of the OLT to a slow acquisition.

8. The program storage device of claim 7, wherein the lowest possible energy level allows fast detection of the burst signal.

9. The program storage device of claim 8, wherein the measured power of the received signal is the reception level of the ONU.

10. The program storage device of claim 6, wherein the method further comprises:

measuring the power of the received burst signal; and updating the reception table with the measured optical power of the received burst signal.

11. An optical line terminal (OLT) controller for power management control in a passive optical network (PON), said OLT comprising:

a power management controller for setting a reception threshold of an optical I receiver with a reception level acquired for an optical network unit (ONU), at normal mode operation of the PON and prior to receiving a burst signal from the ONU; and a memory for storing a reception table that maintains the respective reception level for each of the ONUs using an identification (ID) number of the ONU, wherein, the reception level of the ONU is acquired during a ranging window in a set-up mode operation of the PON.

12. The OLT controller of claim 11, wherein the power management controller is further adapted to acquire the reception level of each ONU.

13. The OLT controller of claim 11, wherein acquiring the reception level during the ranging window further comprises:

receiving at least an identification (ID) number of the ONU;

setting an acquisition mode of the OLT to a fast acquisition;

setting the reception threshold to a lowest possible energy level; measuring the power of a received burst signal, if such signal is received during the ranging window; saving the power of the received signal together with the respective ID number of the ONU in the memory; and setting an acquisition mode of the OLT to a slow acquisition.

14. The OLT controller of claim 13, wherein the lowest possible energy level allows fast detection of the burst signal.

15. The OLT controller of claim 14, wherein the measured power of the received signal is the reception level of the ONU.

16. The OLT controller of claim 11, wherein power management controller is adapted to retrieve the reception level from the reception table according the ID number of the ONU prior to receiving a burst signal from an ONU and to set the reception threshold to the reception level.

17. The OLT controller of claim 16, wherein the power management controller is further adapted to measure the power of the received burst signal and to update the memory with the measured optical power of the received burst signal.

18. The OLT controller of claim 11, wherein the PON is at least one of: an Ethernet PON (EPON) a Gigabit PON (GPON).

* * * * *